US008087709B2

(12) United States Patent
Jackson, Sr.

(10) Patent No.: US 8,087,709 B2
(45) Date of Patent: Jan. 3, 2012

(54) PICKUP TRUCK BED EXTENDER

(76) Inventor: Jesse Van Jackson, Sr., Wilmington, NC (US)

( * ) Notice: Subject to any disclaimer, the term of this patent is extended or adjusted under 35 U.S.C. 154(b) by 0 days.

(21) Appl. No.: 12/928,922

(22) Filed: Dec. 22, 2010

(65) Prior Publication Data
US 2011/0215609 A1 Sep. 8, 2011

Related U.S. Application Data

(63) Continuation-in-part of application No. 12/660,622, filed on Mar. 2, 2010.

(51) Int. Cl.
B60P 3/34 (2006.01)
(52) U.S. Cl. .................................... 296/26.08
(58) Field of Classification Search ............... 296/26.08, 296/26.01, 26.09, 3, 180.1, 50, 26.11, 37.6, 296/26.1; 224/403, 404
See application file for complete search history.

(56) References Cited

U.S. PATENT DOCUMENTS

| 2,727,707 | A | * | 12/1955 | Wells | 248/514 |
|---|---|---|---|---|---|
| 3,205,108 | A | * | 9/1965 | Wilkins | 156/189 |
| 3,589,576 | A | * | 6/1971 | Rinkle et al. | 224/405 |
| 3,765,713 | A | * | 10/1973 | Suitt | 296/3 |
| 4,023,850 | A | * | 5/1977 | Tillery | 296/26.08 |
| 4,057,281 | A | * | 11/1977 | Garrett | 296/3 |
| 4,138,046 | A | * | 2/1979 | De Freze | 224/405 |
| 4,211,448 | A | * | 7/1980 | Weston | 296/3 |
| 4,267,948 | A | * | 5/1981 | Lewis | 224/42.34 |
| 4,770,458 | A | * | 9/1988 | Burke et al. | 296/3 |
| 4,953,757 | A | * | 9/1990 | Stevens et al. | 224/310 |
| 5,037,152 | A | * | 8/1991 | Hendricks | 296/3 |
| 5,143,415 | A | * | 9/1992 | Boudah | 296/3 |
| 5,190,337 | A | * | 3/1993 | McDaniel | 296/3 |
| 5,192,107 | A | * | 3/1993 | Smith, Sr. | 296/3 |
| 5,522,685 | A | * | 6/1996 | Lessard | 410/121 |
| 5,564,773 | A | * | 10/1996 | Lapsley et al. | 296/100.04 |
| 5,628,540 | A | * | 5/1997 | James | 296/3 |
| 5,662,254 | A | * | 9/1997 | Lemajeur et al. | 224/405 |
| 5,700,047 | A | * | 12/1997 | Leitner et al. | 296/26.11 |
| 5,743,702 | A | * | 4/1998 | Gunderson | 414/542 |
| 5,836,635 | A | * | 11/1998 | Dorman | 296/3 |
| 5,911,464 | A | * | 6/1999 | White | 296/26.11 |
| 5,944,371 | A | * | 8/1999 | Steiner et al. | 296/26.09 |
| 6,089,795 | A | * | 7/2000 | Booth | 406/43 |
| 6,113,173 | A | * | 9/2000 | Leitner et al. | 296/26.11 |
| 6,233,874 | B1 | * | 5/2001 | Johnson, Jr. | 49/465 |
| 6,257,637 | B1 | * | 7/2001 | Reed | 296/26.08 |
| 6,402,215 | B1 | * | 6/2002 | Leitner et al. | 296/26.11 |
| 6,425,618 | B1 | * | 7/2002 | Garland et al. | 296/3 |
| 6,698,810 | B1 | * | 3/2004 | Lane | 296/3 |
| 6,719,345 | B2 | * | 4/2004 | Ootsuka et al. | 296/26.08 |
| 6,746,066 | B2 | * | 6/2004 | Reed | 296/26.08 |

(Continued)

Primary Examiner — Kiran B. Patel
(74) Attorney, Agent, or Firm — MacCord Mason PLLC

(57) ABSTRACT

A truck bed extender is described for use with a pickup truck having a bed with a bed floor, opposed side walls along each side of the bed floor and a tailgate hinged at the rear of the bed floor. Spaced, parallel, telescoping arms are pivotally attached at their inner ends to hinge assemblies secured to the floor of the bed adjacent the rear of the bed. A horizontal crossbar providing support for elongated articles is attached to the outer ends of the arms with crossbar connectors. Each hinge assembly includes an eyebolt with a shank inserted into a bore in the bed floor and a yoke attached to the inner end of an arm, with the ears of the yoke attached by a coupling bolt or pin that extends through bores in the yoke ears and the eye of the eyebolt.

12 Claims, 4 Drawing Sheets

U.S. PATENT DOCUMENTS

| | | | |
|---|---|---|---|
| 6,805,392 B2 * | 10/2004 | Leitner et al. | 296/26.08 |
| 6,948,763 B2 * | 9/2005 | Robbins | 296/136.07 |
| 6,991,277 B1 * | 1/2006 | Esler | 296/50 |
| 7,063,366 B2 * | 6/2006 | Leitner et al. | 296/26.11 |
| 7,100,956 B1 * | 9/2006 | Wilkins | 296/37.2 |
| 7,195,432 B2 * | 3/2007 | Earle et al. | 410/94 |
| 7,241,093 B2 * | 7/2007 | Zuniga | 410/97 |
| 7,296,836 B1 * | 11/2007 | Sabo | 296/3 |
| 7,303,222 B2 * | 12/2007 | Wilkins | 296/37.6 |
| 7,464,976 B2 * | 12/2008 | Smith | 296/3 |
| 7,473,269 B1 * | 1/2009 | Hynes | 606/279 |
| 7,533,921 B2 * | 5/2009 | Ferrell | 296/57.1 |
| 7,641,251 B1 * | 1/2010 | Stepanians | 296/3 |
| 7,654,598 B2 * | 2/2010 | Lietner et al. | 296/26.08 |
| 7,665,799 B1 * | 2/2010 | Winter, IV | 296/183.1 |
| 2004/0134953 A1 * | 7/2004 | Perez | 224/403 |
| 2005/0077747 A1 * | 4/2005 | De Gaillard et al. | 296/26.11 |
| 2008/0111390 A1 * | 5/2008 | Smith | 296/50 |
| 2009/0108612 A1 * | 4/2009 | Smith | 296/50 |

* cited by examiner

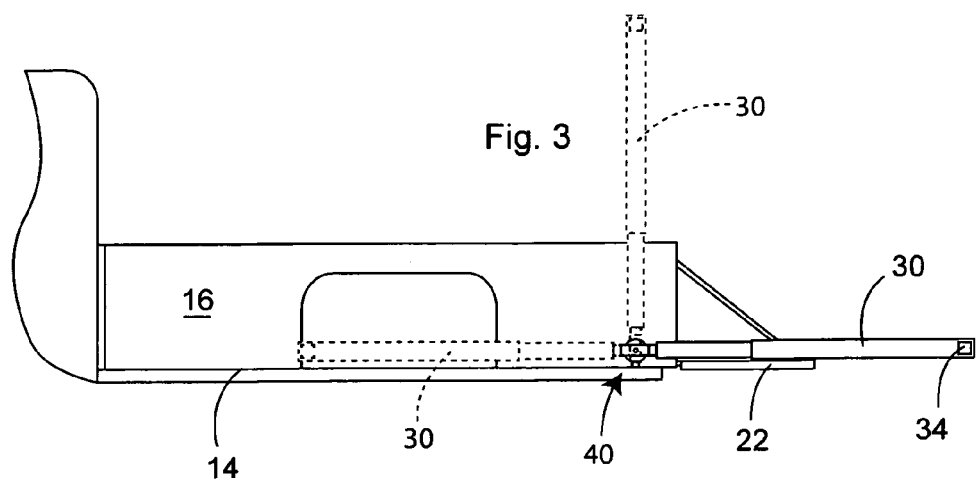
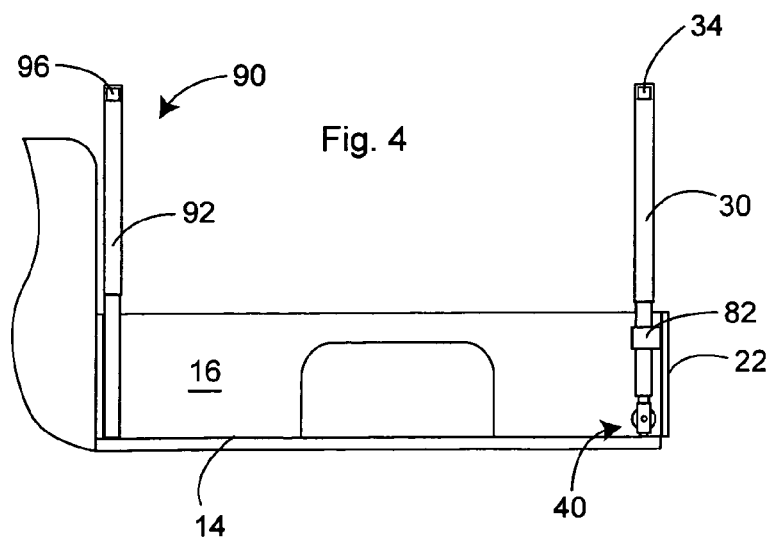

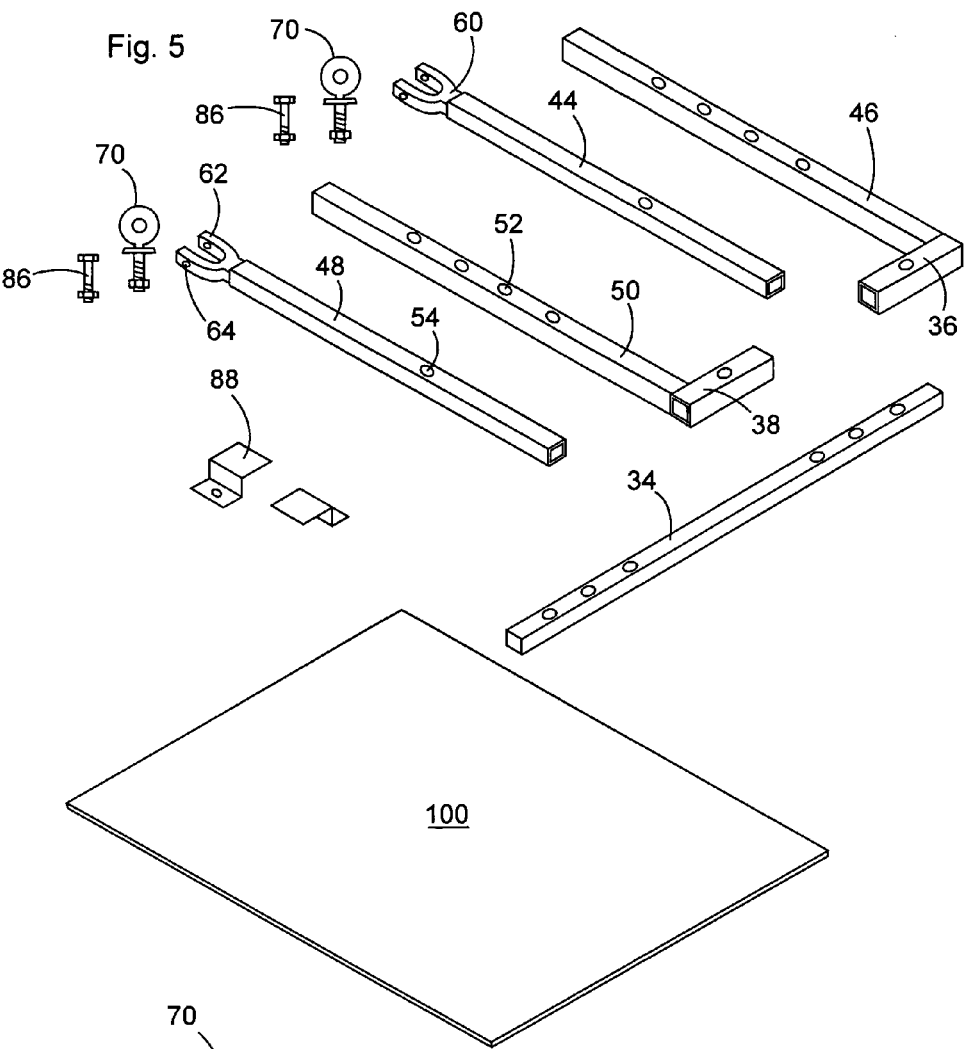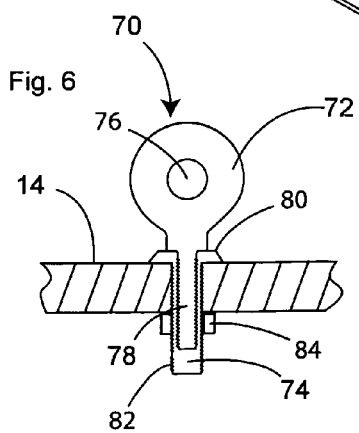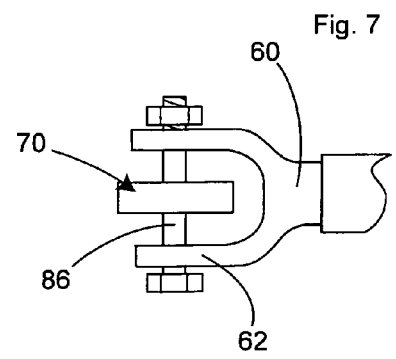

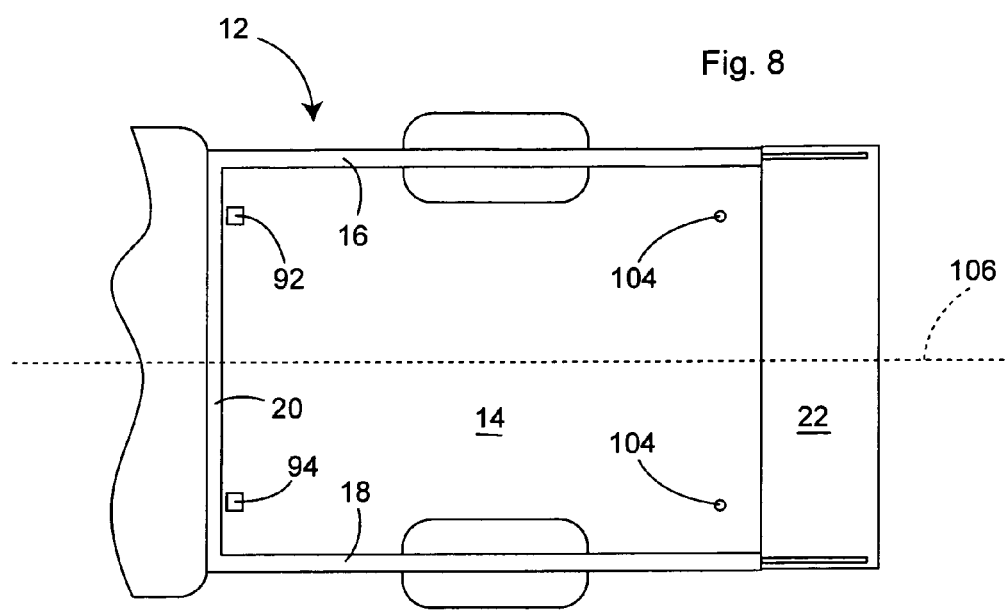

PICKUP TRUCK BED EXTENDER

This application is a Continuation-in-Part of U.S. patent application Ser. No. 12/660,622, filed Mar. 2, 2010, which is incorporated herein by reference in its entirety.

BACKGROUND OF THE INVENTION

1) Field of the Invention

The present invention relates to an apparatus for providing a greater load-bearing surface for a pickup truck bed, and in particular to a pickup truck bed extender that can be quickly attached and removed from a pickup truck bed, and pivoted inside the bed to rest on the bed floor when not in use.

2) Description of the Prior Art

The beds of most pickup trucks are shorter than many items, such as lumber, plywood, ladders, canoes, and other length items that the user needs to transport. As a result, the item extends beyond the back of the pickup truck bed, even with the tailgate in its lowered, horizontal position. Many items extend so far beyond the back of the bed that there is a risk of the item tipping and falling from the bed. In addition, many items require support near the rear end to prevent breakage.

This problem has been long recognized and numerous designs of devices known as truck bed extenders have been proposed. Generally, a conventional truck bed extender is comprised of a lower frame section or base that is attached, e.g., by bolting, to the pickup bed floor, and an upper frame section that is slidably attached to the lower frame section in a manner permitting rearward movement of the upper frame section beyond the rear of the pickup bed, thereby providing a carrying surface of greater length.

These conventional truck bed extenders, while somewhat useful for their designed function, have several disadvantages. Most bed extenders are designed for permanent installation in the truck bed, or are so difficult to remove that they are normally left in the truck bed. When not used as bed extenders, these devices take up a significant percentage of the carrying space available in the truck bed, diminishing the pickup truck's utility.

Pickup truck beds are available in a variety of widths. Many existing truck bed extenders are designed for use with a truck bed of a given dimension. As a result, it is not possible to move the bed extender to a truck bed of a different size. Commercially, manufacture and inventorying of bed extenders of different sizes is required to meet the requirements of different purchasers.

Therefore, there is a continuing need for a pickup truck bed extender that can be quickly installed in and removed from a pickup truck bed. There is also a need for a pickup truck bed that can be easily adjusted to fit different size pickup truck beds.

SUMMARY OF THE INVENTION

Generally, deficiencies of prior art truck bed extenders, including the above deficiencies, are addressed by the present invention, designed for quick and easy installation and removal from a pickup truck bed. As used herein, a pickup truck bed includes a bed floor with front and rear ends and parallel sides; opposed, parallel, vertical side walls attached at the sides of the bed floor; a vertical front wall attached at the front end of the bed floor; and a tail gate having a bottom edge hinged at the rear end of the bed floor. The tail gate is moveable between a closed, vertical orientation, and an open, horizontal orientation.

Unlike prior art bed extenders, the present bed extender is attached with hinge assemblies that are secured to the bed floor adjacent the junctures of the walls and bed floor and adjacent the rear of the bed floor. Generally, the present bed extender includes first and second parallel, telescoping extension arms, each arm having an inner end and an outer end; hinge assemblies pivotally attaching the inner ends of the extension arms to the bed floor, the hinge assemblies including shanks inserting into floor bores; and a crossbar attached to the outer ends of the extension arms, wherein the bed extender is pivotal between a rearward horizontal orientation against the tailgate and extending beyond the tailgate when the tailgate is in its lowered position and a forward horizontal orientation against the bed floor.

Each telescoping arm includes an outer tubular section and in inner section slidable within the outer section. The inner section may have an inner end attached to a hinge assembly, while the outer section has an outer end adapted for connection to the crossbar. However, it will be understood that the sections may be reversed, with the outer section having an inner end attached to a hinge assembly. The outer ends of the telescoping extension arms preferably include crossbar connectors for insertion of an end of the crossbar.

The hinge assemblies are designed for easy attachment of the extension arms, and for easy detachment of the extension arms when the extender is not in use. Generally, each hinge assembly is comprised of an eyebolt having an eye and a shank insertable into a floor bore, a yoke attachable to the inner end of an extension arm having spaced yoke ears with aligned bores positionable on either side of the eyebolt, and a latching pin or bolt (both being generally referred to as pins) insertable through the ear bores and the eyebolt eye to pivotally couple the yoke to the eyebolt. The yoke may, for example, be a Y-shaped yoke including a rearwardly extending shank that is inserted into a bore in the inner end of the telescoping arm.

The telescoping arms include locking means to secure the arm sections together at a desired extension. For example, one section may include one or more holes, while the other telescoping sections also include one or more mating holes, with holes in the two sections being selectively alignable for insertion of a pin or other locking means through the aligned holes to secure the sections together at a desired extension.

The outer ends of the telescoping arms include transverse crossbar connectors with horizontal openings sized to receive the crossbar. The crossbar and connectors also include locking means to secure the crossbar to the connectors. For example, alignable holes in the crossbar and connectors may be included for insertion of a pin or other locking member. The locking member may be permanently attached to one of the crossbar and spring loaded for easy assembly. Preferably, the connector is a transverse tubular arm attached to outer end of the telescoping arm, with the transverse arm having an opening sized to receive the crossbar. For example, a section of square tubing may be welded to the outer end of each arm, with the tubing having an inner diameter sized to receive the crossbar. Preferably, the arms and crossbar are constructed of square tubular metal, e.g., steel or aluminum.

To mount the bed extender in a pickup truck bed, two bores are first drilled at the desired locations in the bed. The bores are aligned transverse to the longitudinal centerline of the truck bed, i.e., a line drawn between the bores will be transverse to the centerline. The bores are preferably drilled equidistant from the centerline so that the extender will be centered on the truck bed.

A shank forming a part of each hinge assembly is inserted into each of the bores and secured in place. For example, if the shank is threaded, a nut can be attached to the shank beneath the truck bed. The telescoping arms and crossbar may be easily detached when not in use.

In a preferred embodiment, each hinge assembly includes an eyebolt with a shank insertable into a pickup bed bore, and a yoke attachable to the inner end of a telescoping arm. The eyebolt and yoke are pivotally coupled by inserting a pin, which may be a threaded bolt, through holes in the yoke ears and the eyebolt eye. The pins are simply removed to detach the arms and crossbar. Generally, the eyebolts will be left in place, since normal use of the truck bed is not affected by the eyebolts, which only extend above the bed by 1 or 2 inches. Alternatively, the extender can simply be rotated into the truck bed for storage. The eyebolt may also be designed with an eye portion that can be detached from the shank when the bed extender is removed from the truck bed.

Note also that the present bed extender is independent of the width of the truck bed. The differences in bed width are taken into account by location of the bed holes, with the crossbar being adjustable within the connectors for different spacing of the arms.

When used to support long items, the bed extender is used in a horizontal position with the tailgate in its lowered, horizontal position, so that the bed extender rests on, and extends rearwardly beyond, the tailgate. If desired, the apparatus can also include releasable attachment brackets to secure the bed extender to the tailgate.

The bed extender can also be used in a vertical orientation with the tailgate closed. In this position, longer items can extend at an upward angle from the front of the truck bed and rest on the horizontal crossbar instead of extending horizontally from the rear of the bed. In this orientation, the extender can also be used to support the rear of ladders and other long items with the front of the item being supported by a front support, which may be a rack on top of the truck cab, or a separate support rack attached to the front wall of the pickup truck bed. The bed extender can also be pivoted forward to a horizontal position where it rests on the bed floor.

The bed extender can also include a cover plate, such as a rectangular metal or wooden plate, attachable to the upper surfaces of the telescoping arms to enable carrying of smaller items. The plate can also be used as a work surface.

BRIEF DESCRIPTION OF THE DRAWINGS

FIG. 3 is a sectional side view of the pickup truck and bed extender of FIG. 1, with the bed extender oriented to the rearward horizontal position, with dotted lines showing orientation of the extender vertically and horizontally toward the front of the pickup bed.

FIG. 4 is a sectional side view of a pickup truck and bed extender of FIG. 1, with the bed extender oriented to the vertical position, and a front support rack attached to the truck bed front wall.

FIG. 5 is a perspective view of the individual components of the bed extender.

FIG. 6 is a detailed sectional side view of the eyebolt attached to a pickup bed.

FIG. 7 is a top view of the hinge assembly.

FIG. 8 is a top view of the pickup truck of FIG. 1 with the bed extender removed to show the bores in the bed floor, and also showing the arms of the front support rack.

DETAILED DESCRIPTION OF THE INVENTION

In the following description, terms such as horizontal, upright, vertical, above, below, beneath, and the like, are used solely for the purpose of clarity in illustrating the invention, and should not be taken as words of limitation. The drawings are for the purpose of illustrating the invention and are not intended to be to scale.

Figure 1:
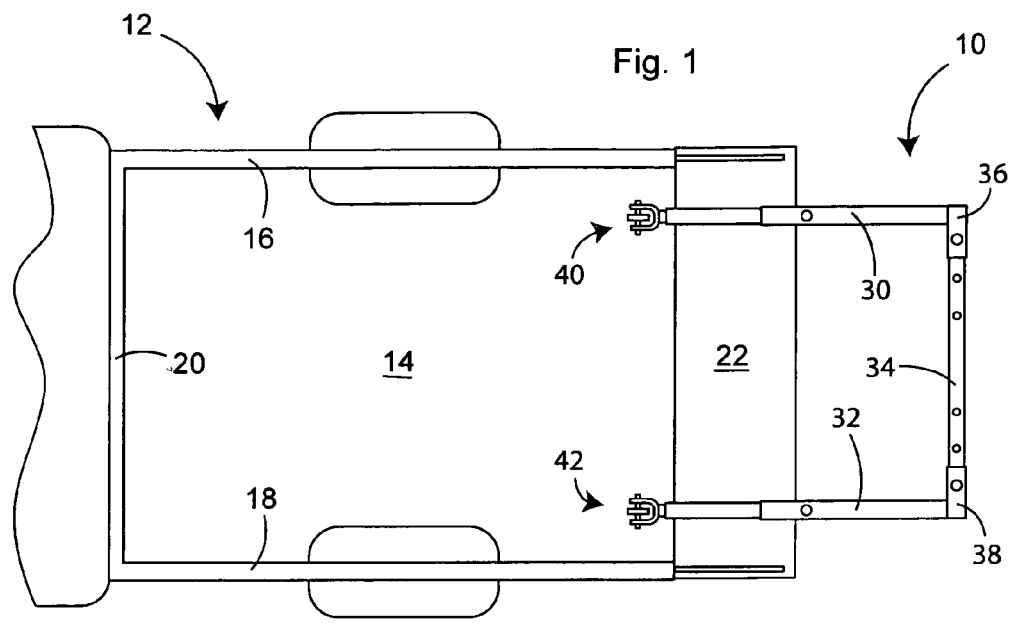
FIG. 1 is a top view of a pickup truck and bed extender, with the bed extender pivoted rearwardly to the horizontal position.
Figure 2:
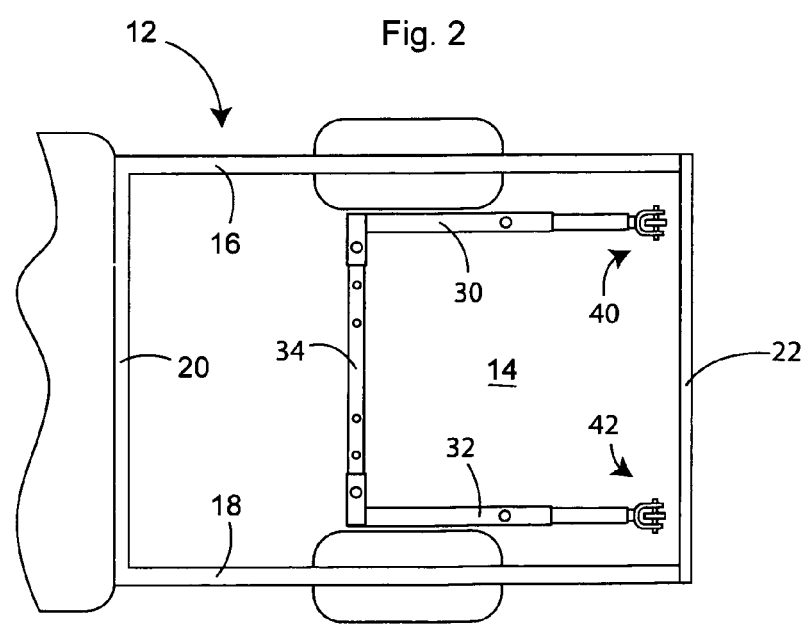
FIG. 2 is a top view of the pickup truck and bed extender of FIG. 1, with the bed extender pivoted forward to rest horizontally on the truck bed floor.

FIGS. 1-4 illustrate a preferred embodiment of bed extender, generally 10, mounted in pickup truck bed, generally 12, and oriented to different positions. Bed 12 includes bed floor 14, side walls 16 and 18, front wall 20, and tailgate 22 hinged at its lower edge to the rear edge of bed floor 14. Tailgate 22 is moveable between a lowered horizontal position as illustrated in FIGS. 1 and 3, and a raised, vertical position as illustrated in FIGS. 2 and 4.

Bed extender 10 is comprised of spaced, parallel, telescoping extension arms 30 and 32, Crossbar 34 slidably inserted into crossbar connectors 36 and 38 attached to the outer ends of arms 30 and 32, respectively, and hinge assemblies 40 and 42 pivotally attaching the inner ends of arms 30 and 32, respectively, to pickup truck bed floor 14.

Arm 30 is comprised of an inner section 44 slidable within an outer section 46, while arm 32 is comprised of an inner section 48 slidable within an outer section 50. Sections 46 and 50 include locking holes 52 selectively engaging spring loaded locking buttons 54 on inner sections 44 and 48 to secure arms 30 and 32 at the desired extensions.

Crossbar connectors 36 and 38 in the illustrated embodiment are comprised of square tubular sections welded to the ends of arms 30 and 32, respectively, transverse to the longitudinal centerline of truck bed 12. Connectors 36 and 38 include horizontal bores having an outer diameter corresponding to the outer diameter of cross bar 34, so that crossbar 34 is slidable within the bores.

Hinge assemblies 40 and 42 are each comprised of a yoke 60 having spaced ears 62 with aligned bores 64, and an eyebolt, generally 70. In the preferred embodiment illustrated in FIG. 6, eyebolt 70 is comprised of an upper bolt section 72 and a lower anchor section 74. Bolt section includes an eye 76 and a threaded shank 78, while anchor section includes a shoulder 80, and a threaded shank 82 with an internal threaded bore to receiving shank 78. Nut 84 is threaded on the end of shank 82. A coupling pin or bolt 86 couples eyebolt 70 to yoke 60.

To minimize interference with other uses of the truck bed, to maximize the extension of bed extender 10, and to provide a bed extender 10 that is oriented horizontally when tailgate 22 is in the lowered position, hinge assemblies 40 and 42 are mounted at or adjacent the rear of bed floor 14, whereby extender 10 will rest horizontally against bed floor 14 when in the forward orientation and horizontally against tailgate 22 when in the rearward orientation with tailgate 22 is in its lowered position.

Optionally, bed extender 10 may also include tailgate brackets 88 to releasably attach arms 30 and 32 to the inner wall of tailgate 22, providing greater stability. Brackets 88 can also be used to hold bed extender 10 in the vertical position as shown in FIG. 4. The exact configuration of brackets 88 is not critical, so long as the brackets secure extender 10 and are readily removable when uninstalling extender 10.

An optional, vertical support rack, generally 90, can be mounted at front wall 20, as illustrated in FIGS. 4 and 8, to support elongated items above truck bed 12. Support rack 90 is comprised of spaced vertical telescoping arms 92 and 94, having horizontal support rack crossbar 96 attached to the upper ends of arms 92 and 94.

Bed extender 10 may also include rectangular cover plate 100, sized for attachment to arms 30 and 32 when extender 10 is in the rearward horizontal position. Plate may be of metal or wood, e.g., plywood or MDF. Plate may be attached with bolts or other suitable means, not shown.

Pickup bed 12 is prepared for installation of bed extender 10 by first drilling a pair of spaced bores 104 in floor 14 adjacent the rear edge of floor 14 and equidistant on either side of an imaginary longitudinal centerline 106 as illustrated in FIG. 8. Shanks 82 of eyebolts 70 are then inserted through bores 104 and bolted in place with nuts 84 as shown in FIG. 6. Yokes 60 are then placed with yoke ears 62 on either side of eyebolt 70 and bolt 80 is inserted through ear bores 64 and eye 76 to pivotally attach the inner ends of arms 30 and 30 to floor 14. Either before or after attachment of yokes 60, crossbar 34 is slid through crossbar connectors 36 and 38.

In use, with tailgate 22 in its lowered, horizontal position, extender 10 is pivoted rearwardly to the horizontal position as illustrated in FIG. 1. In this position, elongated articles, e.g., lumber, can be placed in bed 14 with the rear of the articles extending beyond the rear of bed 14, so that the rear of the articles rest on and are supported by crossbar 34. When not in use, extender 10 can be pivoted through an 180° arc to rest on inside pickup bed 12 on floor 14 between side walls 16 and 18.

Certain modifications and improvements will occur to those skilled in the art upon a reading of the foregoing description. It should be understood that all such modifications and improvements have been deleted herein for the sake of conciseness and readability but are properly within the scope of the following claims.

What is claimed is:

1. A truck bed extender for use with a pickup truck having a bed with a longitudinal centerline, a bed floor with spaced floor bores equidistant from said centerline and aligned transverse to said centerline, a vertical front wall at the front of the bed floor, opposed side walls along each side of the bed floor, and a tailgate having a raised vertical position and a lowered horizontal position hinged at the rear of the bed floor comprising:
   a) first and second telescoping extension arms, each arm having an inner end and an outer end with a crossbar connector;
   b) hinge assemblies pivotally attaching the inner ends of said extension arms to said bed floor, said hinge assemblies including an eyebolt having an eye and a shank insertable into a floor bore, a yoke attached to the inner end of an extension arm and spaced yoke ears with aligned bores positionable on either side of said eyebolt, and a latching pin or bolt insertable through said ear bores and said eyebolt eye; and
   c) a crossbar attached to the said crossbar connectors, wherein said bed extender is pivotal between a rearward horizontal orientation against said tailgate when said tailgate is in its lowered position and a forward horizontal orientation against said bed floor, said extender extending rearwardly beyond the tailgate when in the rearward horizontal orientation.

2. The truck bed extender of claim 1, wherein each of said telescoping arms includes an outer tubular section and in an inner section slidable within said outer tubular section.

3. The truck bed extender of claim 1, further including tailgate hinge assemblies attachable to the inner side of said tailgate and to said extension arms.

4. The truck bed extender of claim 1, further including a platform attachable to said extension arms.

5. The truck bed extender of claim 1, wherein said hinge assemblies are adjacent the tailgate of said truck bed.

6. The truck bed extender of claim 1, further including locking means to secure said crossbar to said arms.

7. A pickup truck and a truck bed extender combination comprising:
   a) a pickup truck having a bed with a longitudinal centerline, a bed floor with spaced floor bores equidistant from said centerline and aligned transverse to said centerline, a vertical front wall at the front of the bed floor, opposed side walls along each side of the bed floor, and a tailgate having a raised vertical position and a lowered horizontal position hinged at the rear of the bed floor; and
   b) the truck bed extender including first and second telescoping extension arms, each arm having an inner end and an outer end with a crossbar connector, hinge assemblies pivotally attaching the inner ends of said extension arms to said bed floor, said hinge assemblies including an eyebolt having an eye and a shank insertable into a floor bore, a yoke attached to the inner end of an extension mm and spaced yoke ears with aligned bores positionable on either side of said eyebolt, and a latching pin or bolt insertable through said ear bores and said eyebolt eye; and a crossbar attached to the said crossbar connectors, wherein said bed extender is pivotal between a rearward horizontal orientation against said tailgate when said tailgate is in its lowered position and a forward horizontal orientation against said bed floor, said extender extending rearwardly beyond the tailgate when in the rearward horizontal orientation.

8. The pickup truck and truck bed extender combination of claim 7, wherein each of said telescoping arms includes an outer tubular section and an inner section slidable within said outer tubular section.

9. The pickup truck and truck bed extender combination of claim 7, further including tailgate hinge assemblies attachable to the inner side of said tailgate and to said extension arms.

10. The pickup truck and truck bed extender combination of claim 7, further including a platform attachable to said extension arms.

11. The pickup truck and truck bed extender combination of claim 7, wherein said hinge assemblies are adjacent the tailgate of said truck bed.

12. The pickup truck and truck bed extender combination of claim 7, further including locking means to secure said crossbar to said arms.

* * * * *